US012630109B2

(12) United States Patent (10) Patent No.: US 12,630,109 B2
Akoma et al. (45) Date of Patent: May 19, 2026

(54) CHAMBER ADJUSTABLE STIFFNESS AIRBAG

(71) Applicant: SCHROTH SAFETY PRODUCTS LLC, Pompano Beach, FL (US)

(72) Inventors: Patrick Akoma, Pompano Beach, FL (US); Manuel Marroquin, Pompano Beach, FL (US); Kasey Garces, Coconut Creek, FL (US)

(73) Assignee: SCHROTH SAFETY PRODUCTS LLC, Pompano Beach, FL (US)

( * ) Notice: Subject to any disclaimer, the term of this patent is extended or adjusted under 35 U.S.C. 154(b) by 0 days.

(21) Appl. No.: 17/946,608

(22) Filed: Sep. 16, 2022

(65) Prior Publication Data

US 2023/0081682 A1 Mar. 16, 2023

Related U.S. Application Data

(63) Continuation of application No. 17/181,357, filed on Feb. 22, 2021, now Pat. No. 11,479,201.

(60) Provisional application No. 62/978,886, filed on Feb. 20, 2020.

(51) Int. Cl.
| | |
|---|---|
| *B60R 21/233* | (2006.01) |
| *B60R 21/00* | (2006.01) |
| *B60R 21/231* | (2011.01) |
| *B60R 21/235* | (2006.01) |
| *B60R 21/239* | (2006.01) |

(52) U.S. Cl.
CPC .......... *B60R 21/233* (2013.01); *B60R 21/235* (2013.01); *B60R 21/239* (2013.01); *B60R 2021/0093* (2013.01); *B60R 2021/23107*

(2013.01); *B60R 2021/23308* (2013.01); *B60R 2021/23509* (2013.01); *B60R 2021/23576* (2013.01)

(58) Field of Classification Search
CPC .......... B64D 11/06205; B64D 2201/00; B60R 2021/0093; B60R 2021/23107; B60R 2021/23153; B60R 2021/23308; B60R 2021/23324; B60R 2021/23332; B60R 2021/23509; B60R 2021/23538; B60R 2021/23576; B60R 2021/2615; B60R 21/207; B60R 21/233; B60R 21/235; B60R 21/239
See application file for complete search history.

(56) References Cited

U.S. PATENT DOCUMENTS

| | | | | |
|---|---|---|---|---|
| 6,209,908 B1 * | 4/2001 | Zumpano | ............ | B60R 21/2072 |
| | | | | 280/730.1 |
| 6,616,177 B2 * | 9/2003 | Thomas | ................ | B60R 21/233 |
| | | | | 280/736 |

(Continued)

FOREIGN PATENT DOCUMENTS

| | | | | |
|---|---|---|---|---|
| JP | 05131889 A | * | 5/1993 | |

*Primary Examiner* — Laura Freedman
(74) *Attorney, Agent, or Firm* — Smith, Gambrell & Russell, LLP

(57) ABSTRACT

The present invention discloses a multiple-chamber airbag structure where the airbag design has at least a stiff lower section to reduce the chest velocity and a soft upper section to meet the HIC requirements. Although stowed and deployed as a unitary airbag, the present invention includes separate chambers, which allows for independent gas inflation and stiffness control with venting.

3 Claims, 5 Drawing Sheets

CHAMBER ADJUSTABLE STIFFNESS AIRBAG (CENTER OR SIDE MOUNT) DUAL CHAMBER INFLATION

SIDE VIEW

UPPER CHAMBER AIRFLOW
LOWER CHAMBER AIRFLOW
INFLATOR/DIFFUSER
AIRBAG HOUSING
U-SHAPE PROTRUSION

(56)     References Cited

U.S. PATENT DOCUMENTS

| | | | | |
|---|---|---|---|---|
| 7,232,001 | B2 * | 6/2007 | Hakki | ................... B60R 19/205 |
| | | | | 180/271 |
| 8,376,396 | B2 * | 2/2013 | Miller | ................... B60R 21/206 |
| | | | | 280/736 |
| 9,487,177 | B2 * | 11/2016 | Schneider | ............. B60R 21/206 |
| 10,065,595 | B1 * | 9/2018 | Kipnis | ............... B60R 21/2334 |
| 10,857,966 | B2 * | 12/2020 | Deng | ................... B60R 21/205 |
| 10,933,830 | B2 * | 3/2021 | Einarsson | ............ B60R 21/207 |
| 11,479,201 | B2 * | 10/2022 | Akoma | ................. B60R 21/239 |
| 2013/0088056 | A1 * | 4/2013 | Quatanens | ........... B60R 21/231 |
| | | | | 297/216.13 |

* cited by examiner

CHAMBER ADJUSTABLE STIFFNESS AIRBAG (CENTER OR SIDE MOUNT) DUAL CHAMBER INFLATION

FRONTAL VIEW

UPPER CHAMBER

U-SHAPE PROTRUSION

LOWER

LOWER

SIDE VIEW

U
P
P
E
R

UPPER

LOWER

LOWER

U-SHAPE PROTRUSION

UPPER CHAMBER AIRFLOW
LOWER CHAMBER AIRFLOW
INFLATOR/DIFFUSER
AIRBAG HOUSING
U-SHAPE PROTRUSION

CHAMBER ADJUSTABLE STIFFNESS AIRBAG
(CENTER OR SIDE MOUNT) DUAL CHAMBER INFLATION
AIRFLOW

FRONTAL VIEW

VENTING

SIDE VIEW

UPPER CHAMBER AIRFLOW
LOWER CHAMBER AIRFLOW
INFLATOR/DIFFUSER
AIRBAG HOUSING
U-SHAPE PROTRUSION

CHAMBER ADJUSTABLE STIFFNESS AIRBAG (TOP MOUNT) DUAL CHAMBER INFLATION

SIDE VIEW

FRONTAL VIEW

RIGHT CHAMBER
LEFT CHAMBER
INFLATOR/DIFFUSER
AIRBAG HOUSING
U-SHAPE PROTRUSION

CHAMBER ADJUSTABLE STIFFNESS AIRBAG (TOP MOUNT) DUAL CHAMBER INFLATION AIRFLOW

FRONTAL VIEW

U-SHAPE PROTRUSION

VENTING

SIDE VIEW

U-SHAPE PROTRUSION

RIGHT CHAMBER
LEFT CHAMBER
INFLATOR/DIFFUSER
AIRBAG HOUSING
U-SHAPE PROTRUSION

CHAMBER ADJUSTABLE STIFFNESS AIRBAG

CROSS-REFERENCE TO RELATED APPLICATIONS

This application is a continuation application of U.S. Non-Provisional patent application Ser. No. 17/181,357 filed on 22 Feb. 2021, which claims the benefit of priority to U.S. Provisional patent application Ser. No. 62/978,886 filed on 20 Feb. 2020, all of which are incorporated, by reference, in its entirety as if fully set forth herein.

FIELD OF THE INVENTION

The present invention generally relates to airbags and more specifically, to an apparatus, system, and related method of using a chamber adjustable stiffness airbag in an aircraft, or other vehicle, during a sudden acceleration/deceleration such as a crash event, as well as airbags for same.

BACKGROUND OF THE INVENTION

Disposing airbag assemblies within airplanes or other vehicles is generally known. Additionally, airbags and airbag systems that are mounted on or within seats, monuments, or other structures for the protection of occupants or passengers located opposite or facing such structures are also generally known.

Especially in airplanes, the use of airbags to address Head Injury Criteria (HIC) requirements in a crash event has come at the cost of meeting the Neck Injury (Nij) requirements. A softer airbag would help with the HIC requirements, but at the cost of the Nij requirements. A stiffer airbag would reduce the chest velocity, helping Nij, but at the cost of the HIC requirements.

Currently, airbags are designed to be deployed with a singular function. In applications where more than one function is required—multiple airbags are employed. This creates an issue in vehicles such as airplanes where space is at a premium.

It would be advantageous, then, to have a multi-chambered airbag with adjustable stiffness that has a stiff lower section to reduce the chest velocity and a soft upper section to meet the HIC requirements.

SUMMARY

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

As used throughout this disclosure, a "crash event" is any sudden acceleration/deceleration, collision, impact, rollover, etc. . . . of a moving vehicle. Generally, safety features for moving vehicles are designed to protect seat occupants from injuries sustained when the moving vehicle experiences a crash event. Although the various embodiments of the present disclosure are shown and described within the context of a safety system for airplane passengers, one with ordinary skill in the art will appreciate and understand that the apparatuses, systems, and methods as described herein can also be advantageously applied in other types of moving vehicles, such as helicopters, automobiles, trucks, buses, carts, boats, and amusement park rides. It is to be understood that the embodiments as described are not, necessarily, limited to use with airplane seats. One with knowledge in the art will also understand that commonly used components associated with airbag assemblies are either not shown or not described in detail in order to avoid obscuring relevant aspects of the pertinent technology.

We disclose a unitary, but multi-chambered, airbag apparatus with at least 1) a soft upper chamber, and 2) a stiff lower chamber. As used herein, the terms "soft" and "stiff" are meant to be relative to each other and not some absolute value, but rather, determined and configured by the ordinarily skilled artisan when configuring each airbag according to the present invention in relation to its installed environment and occupant safety parameters. As used herein, then, when referring to an airbag chamber's capacity to resist an applied force or load, a "soft" chamber will have less capacity to resist an applied load relative to a "stiff" chamber, which will have a higher capacity to resist an applied load.

Similarly, the terms "upper" and "lower" (as well as their equivalents: "above" and "below") are terms of positional relativity. As used herein, the term "upper" is related to the positioning of the chamber relative to the structure to which the apparatus is mounted, that chamber configured, or adapted, to reduce head injury and to meet a pre-determined Head-strike Injury Criteria (HIC) requirement. As used herein, the term "lower" is related to the positioning of the chamber relative to the structure to which the apparatus is mounted, that chamber configured, or adapted, to reduce the velocity of the chest of an occupant for which the airbag apparatus has been adapted to receive in a crash event. In the embodiments disclosed herein, as well as in typical use cases, the apparatus, as adapted for use in a typical seating application for a human occupant, the "upper" chamber is positioned vertically above the "lower" chamber, once deployed, and relative to the seat and occupant.

The present invention differs from the current state of the art in that the airbag design has at least a stiff lower section to reduce the chest velocity and at least a soft upper section to meet the HIC requirements. Although stowed and deployed as a unitary airbag, the present invention includes separate chambers, which allows for independent gas inflation and stiffness control with venting.

The structure of an airbag according to the present invention is such that, as opposed to multiple separate airbags deployed simultaneously, the present invention is a single airbag with a plurality of structures internal to the airbag. These internal structures, preferably of the same or similar fabric as the airbag itself, include at least one structure that divides the internal area of the airbag into at least two distinct chambers, between which airflow is substantially restricted. Additional structures may be present within each individual chamber that are configured to direct airflow within each chamber. These intra-chamber structures may additionally be configured to control how the chamber portion deploys (unfolds) and may further be configured to control the inflated shape and rigidity of each chamber. Furthermore, each chamber may be configured with vents or other equivalent structures that are configured to control the flow rate of air/gas expelled from (or held within) each chamber. In this way, the airbag is configured with at least two or more distinct chambers with their own inflation/deflation and stiffness characteristics.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which.

Figure 1B:
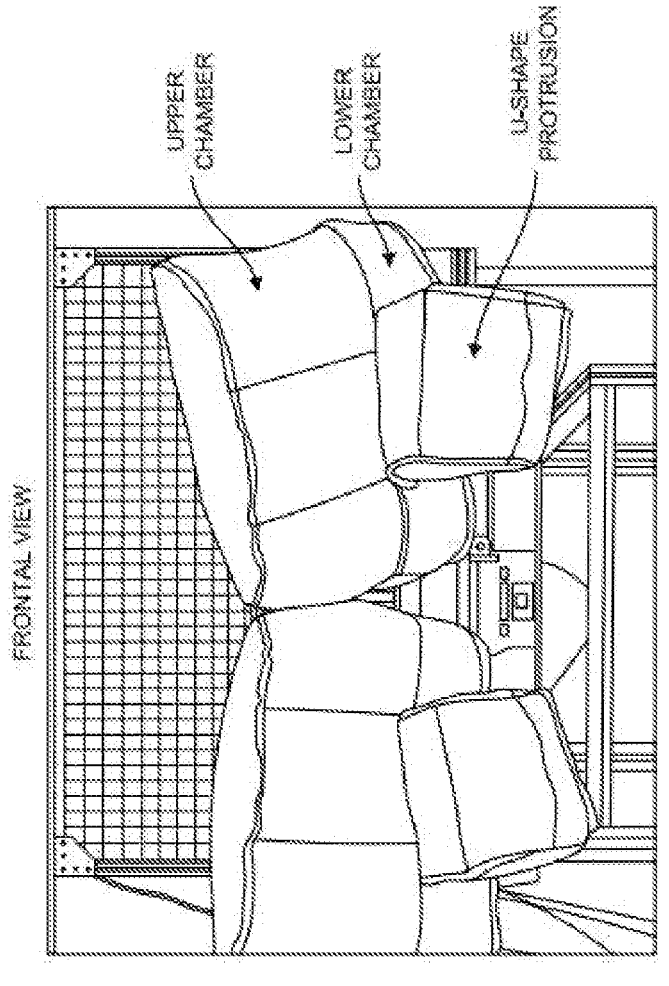
FIG. 1A and FIG. 1B show front and side view photographs of fully deployed chamber adjustable stiffness airbags according to an embodiment of the present invention, where two airbags are shown in the "FRONTAL VIEW" in a side-by-side configuration (FIG. 1B)

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Figure 1A:
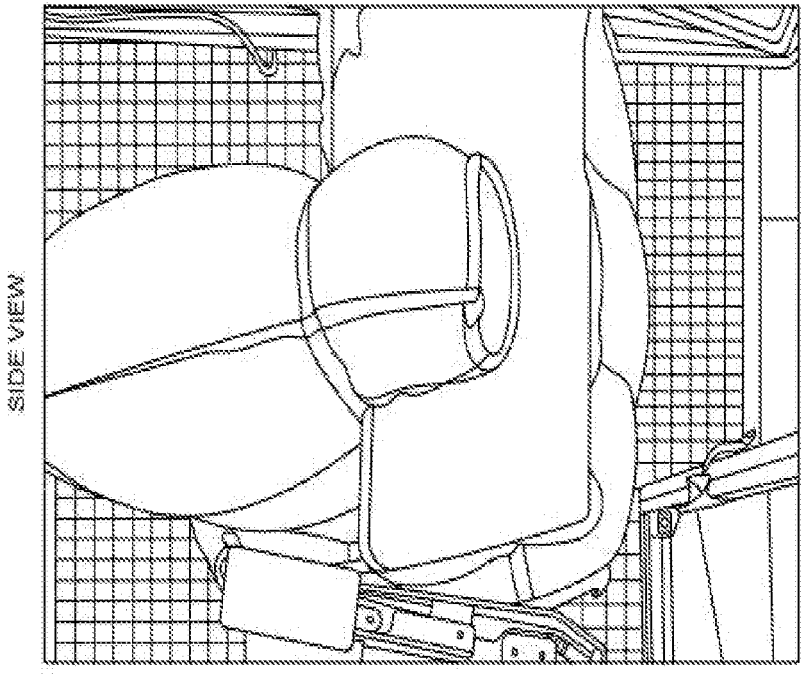

By way of example and not limitation, we refer now to the Figures and disclose a preferred embodiment of a Chamber Adjustable Stiffness Airbag according to the present invention. FIG. 1A and FIG. 1B show the airbag in its deployed (inflated) state. The airbag is comprised of an upper airbag chamber and a lower airbag chamber. In this embodiment, the upper airbag chamber is configured to be the "soft" chamber. Through the use of vents, the inflation gas can be selectively released by the force of a head strike, causing the airbag to yield in response to the head impact. This upper airbag chamber is therefore adapted for HIC reduction.

The lower airbag chamber is in physical communication with the upper airbag chamber—they are connected and deploy together—but not in fluid communication. Inflation gas that flows into one chamber does not flow into the other chamber. The lower airbag chamber is configured to be the "stiff" chamber. It is not vented, and therefore, retains the inflation gas more than the upper, vented, chamber. The stiff lower airbag chamber is therefore adapted to arrest chest velocity thereby resulting in a reduction of Nij. In order to effectuate the reduction in chest velocity, the lower airbag chamber also preferably is configured with one or more lower chamber protrusions.

The lower chamber protrusions are designed to make early contact with the passenger's chest, as well as with the adjacent monument or seat structure from the lower chamber extension(s), during inflation. These lower chamber protrusions are designed to control the airbag position with respect to the monument or seat structure during inflation.

The airbag itself is preferably constructed of a flame resistant fabric for the construction of aviation airbags which meets the stringent vertical flammability requirements of FAR 25.853, as well as, meeting the FAA's high pressure permeability resistance requirements.

In embodiments, each chamber is filled (inflated) utilizing a single inflator for each chamber, with same or different size/mol. In these embodiments there is no shared airflow between chambers with a one-to-one relation of inflator and airbag.

In other embodiments, it is contemplated that multiple chambers may be inflated by the same inflator. For example, a single inflator may feed into a manifold which in turn sends the gas to each chamber. The manifold may be configured to have a pre-set distribution of gas to each chamber as desired. Additionally, the manifold may be configured with adjustable and/or programmable dampers so that the percentage of gas distribution can be variable and configurable to result in the desired stiffness upon inflation.

The stowed airbag is, as may be known in the art, folded and contained within a metal housing or fabric covering used to contain the airbag. In the case of a fabric bag wrap, the bag has perforations which rip during airbag inflation.

Airbag gas inflators are communicative with the airbag chambers via inflation tubes and gas diffusers (metal and plastic).

It is to be understood by a person skilled in the art that the present invention is not to be limited to two chambers. Rather, it is within the scope of the present invention that the core of the invention presented is a multi-chambered airbag where not only the shape, but also the stiffness, of each airbag chamber is selectively adjustable in order to achieve the desired safety performance from the airbag as a whole.

Referring now to FIG. 1A and FIG. 1B, a front-facing (FIG. 1B) and side view (FIG. 1A) of exemplary airbags are shown. In the photographs, the airbag apparatus is shown inflated and deployed out of the back of a seat. FIG. 1B shows two airbags. Each airbag has an upper chamber and a lower chamber. The lower chamber additionally has a u-shaped protrusion that extends perpendicularly to the upper and lower chambers.

Figures 2A, 2B:
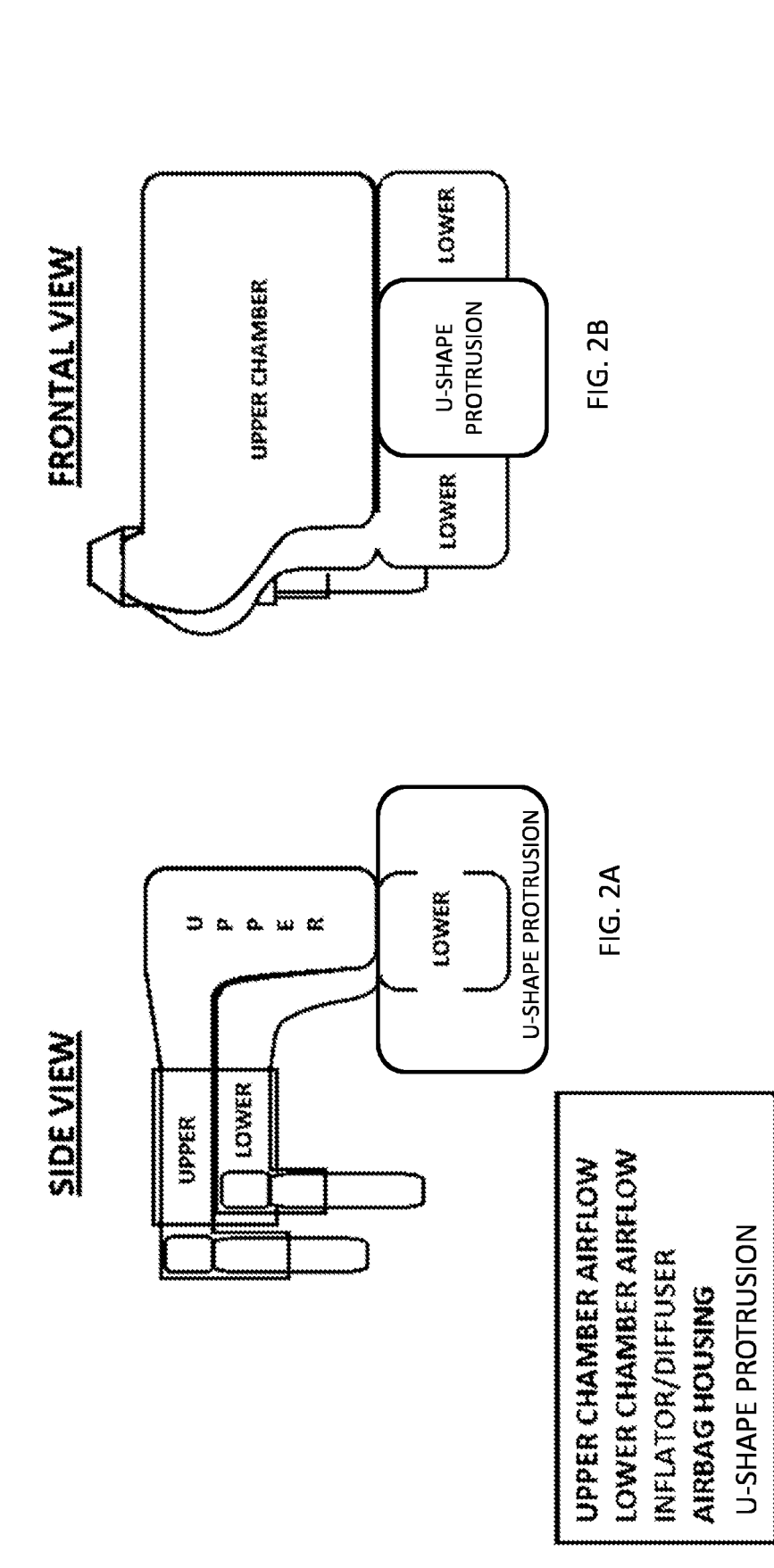
FIG. 2A and FIG. 2B show simplified representations of front and side views of fully deployed chamber adjustable stiffness airbags according to an embodiment of the present invention.

FIG. 2A and FIG. 2B depict a simplified representation of the type of exemplary airbag system shown in the photographs of FIG. 1A and FIG. 1B.

Figures 3A, 3B:
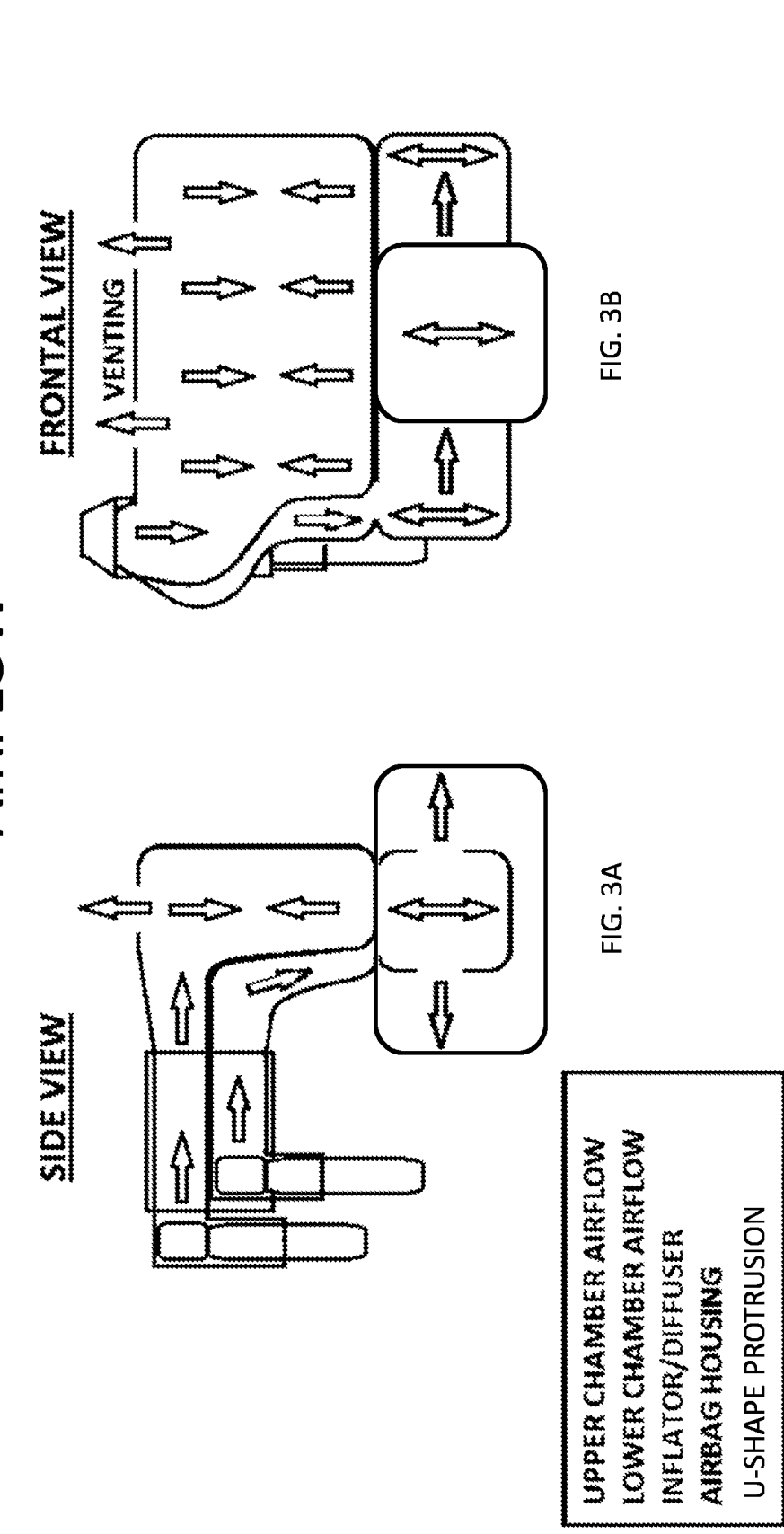
FIG. 3A and FIG. 3B show simplified representations of front and side views of fully deployed chamber adjustable stiffness airbags and the dual chamber inflation airflow according to an embodiment of the present invention.
Figures 4A, 4B:
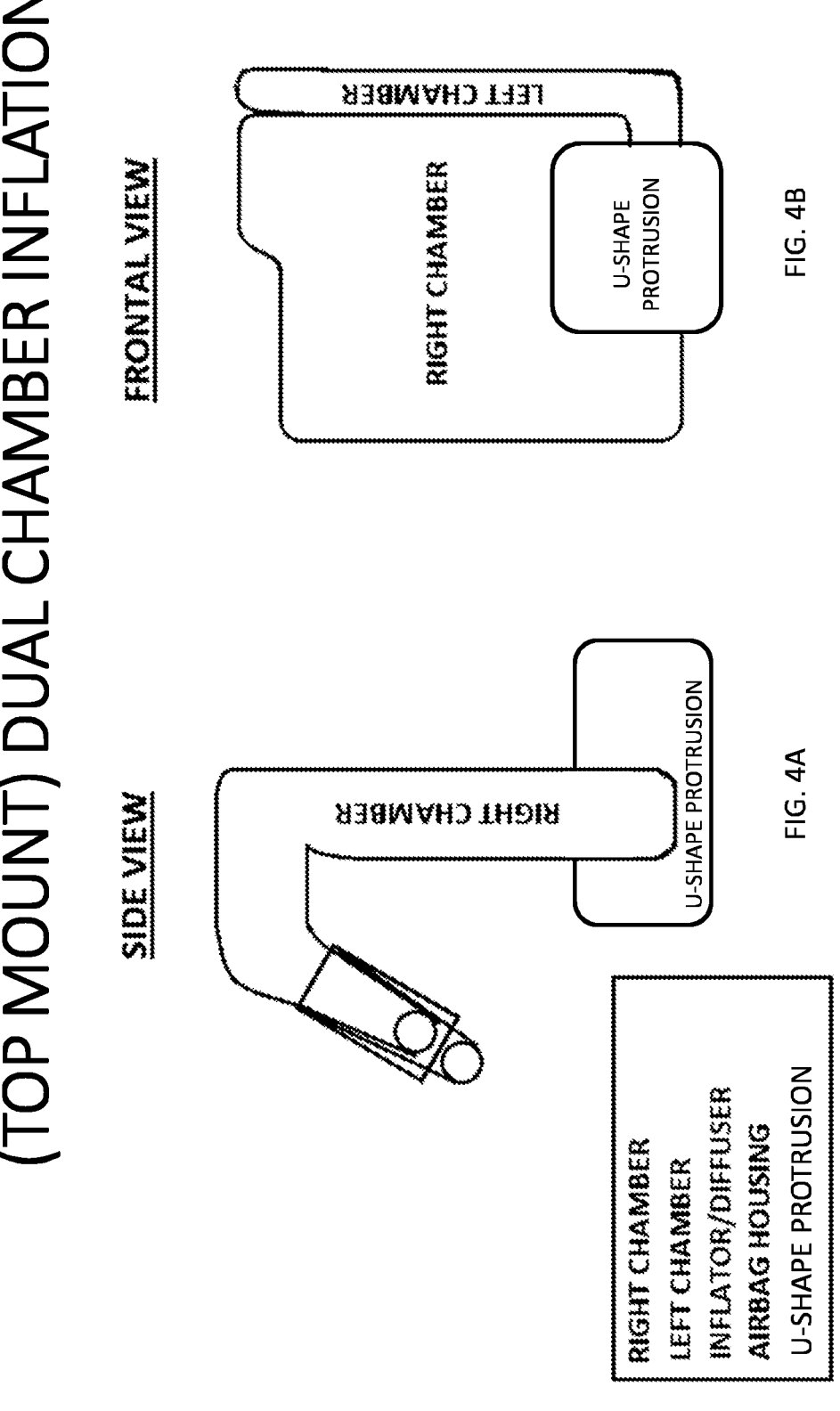
FIG. 4A and FIG. 4B show simplified representations of front and side views of fully deployed chamber adjustable stiffness airbags according to an embodiment of the present invention.
Figures 5A, 5B:
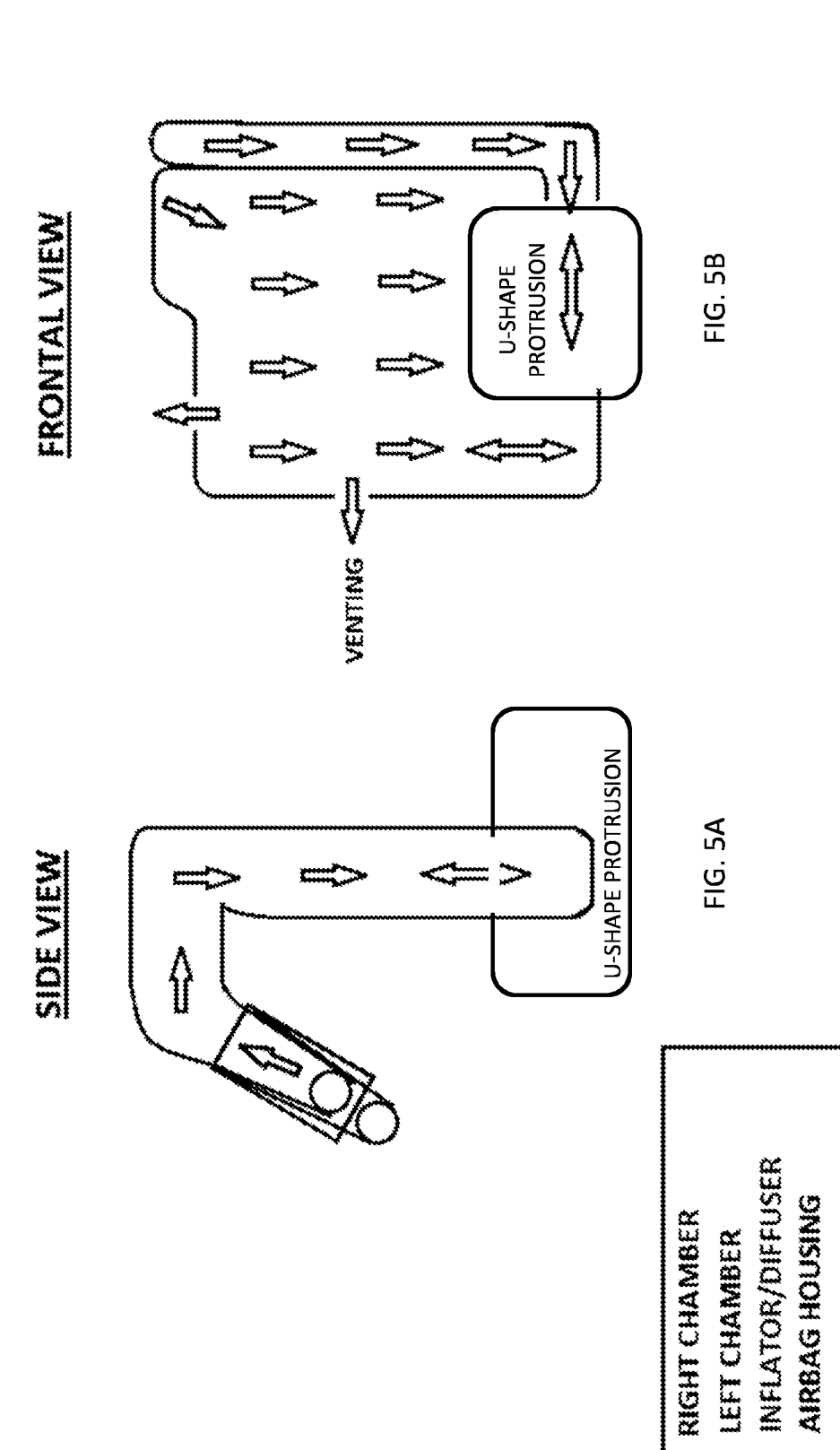
FIG. 5A and FIG. 5B show simplified representations of front and side views of fully deployed chamber adjustable stiffness airbags and the dual chamber inflation airflow according to an embodiment of the present invention.

FIG. 3A and FIG. 3B depict a simplified representation of airflow (inflation gas) through the exemplary airbag system shown and described in FIG. 1A, FIG. 1B and FIG. 2A, FIG. 2B.

Whereas FIGS. 1A, 1B, 2A, 2B, 3A, and 3B disclose embodiments of a chamber adjustable stiffness airbag and system that is configured as a center- or side-mounted system relative to a seat back, FIGS. 4A, 4B and FIGS. 5A, 5B are simplified representations of an embodiment disclosing the invention configured to be top-mounted relative to a seat or other structure.

The embodiments shown and described disclose only some of the mounting and deployment configurations for which the present invention is capable of being configured. It is within the scope and intent of the present disclosure that the chamber adjustable stiffness airbag and system may be configured to multiple shapes and configurations as may be required to provide the desired level of occupant safety.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A unitary, multi-chambered airbag apparatus comprising:

a single airbag constructed out of a plurality of aviation-grade flame resistant and high pressure permeability resistant fabric panels;

a plurality of structures internal to the unitary, multi-chambered airbag apparatus;

at least one of the plurality of structures, constructed of the same fabric as the single airbag panels, dividing an internal area of the unitary, multi-chambered airbag apparatus into at least two distinct chambers, the at least two distinct chambers being structurally isolated from each other such that they are not in fluid communication with each other during inflation and each chamber being connected to and inflated by a separate dedicated inflator, and each of the at least two distinct chambers having its own dedicated vent whereby the relative stiffness of each of the at least two distinct chambers can be independently regulated; and one or more additional structures disposed within each of the at least two distinct chambers configured to direct the airflow within each of the at least two distinct chambers.

2. The unitary, multi-chambered airbag apparatus of claim 1, wherein the one or more additional structures are configured to control how either of the at least two distinct chambers deploys.

3. The unitary, multi-chambered airbag apparatus of claim 1, wherein each dedicated inflator is not in fluid communication with the other dedicated inflator.

* * * * *